United States Patent
Kim

(10) Patent No.: US 10,644,567 B2
(45) Date of Patent: May 5, 2020

(54) MOTOR AND CLUTCH ACTUATOR INCLUDING SAME

(71) Applicant: LG Innotek Co., Ltd., Seoul (KR)

(72) Inventor: Chan Seok Kim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 275 days.

(21) Appl. No.: 15/540,945

(22) PCT Filed: Aug. 6, 2015

(86) PCT No.: PCT/KR2015/008242
§ 371 (c)(1),
(2) Date: Jun. 29, 2017

(87) PCT Pub. No.: WO2016/108379
PCT Pub. Date: Jul. 7, 2016

(65) Prior Publication Data
US 2017/0358970 A1    Dec. 14, 2017

(30) Foreign Application Priority Data

Dec. 29, 2014   (KR) .................. 10-2014-0192403

(51) Int. Cl.
*F16D 29/00*   (2006.01)
*H02K 7/14*    (2006.01)
(Continued)

(52) U.S. Cl.
CPC ............. *H02K 7/14* (2013.01); *F16D 25/082* (2013.01); *F16D 25/12* (2013.01); *F16D 29/005* (2013.01);
(Continued)

(58) Field of Classification Search
CPC ........ H02K 7/14; H02K 11/33; H02K 11/215; H02K 7/06; H02K 11/38; H02K 11/20;
(Continued)

(56) References Cited

U.S. PATENT DOCUMENTS 9,784,256 B2 * 10/2017 Franz .................. F15B 7/08
2002/0117908 A1 * 8/2002 Sanchez ................ H02K 5/24
310/51
(Continued)

FOREIGN PATENT DOCUMENTS

CN     102575729 A     7/2012
DE  10 2010 047 801 A1  5/2011
(Continued)

OTHER PUBLICATIONS

Office Action dated Jun. 4, 2019 in Japanese Application No. 2017-535438.
(Continued)

*Primary Examiner* — David J Hlavka
(74) *Attorney, Agent, or Firm* — Saliwanchik, Lloyd & Eisenschenk

(57) ABSTRACT

The present invention provides a motor including: a housing; a control part coupled to the housing; a stator assembly coupled to an inside of the housing and connected to the control part; a rotor disposed inside the stator; a rotary shaft coupled to the rotor; and a sensor connecting part including a body mounted on the housing and having a sensor mounting part, and a terminal included in the body and connected to the sensor mounting part and the control part, wherein the sensor mounting part is disposed outside the housing, and thus provides advantageous effects in that a configuration and an operation of connecting sensors to a control module are simplified, efficiency of an assembly operation is increased, and reliability of sensing information is improved.

13 Claims, 10 Drawing Sheets

(51) Int. Cl.
| | |
|---|---|
| *H02K 5/22* | (2006.01) |
| *H02K 11/38* | (2016.01) |
| *H02K 7/108* | (2006.01) |
| *H02K 17/32* | (2006.01) |
| *H02K 7/116* | (2006.01) |
| *H02K 11/20* | (2016.01) |
| *F16D 25/08* | (2006.01) |
| *G01D 11/24* | (2006.01) |
| *H02K 11/215* | (2016.01) |
| *H02K 11/33* | (2016.01) |
| *F16D 25/12* | (2006.01) |
| *G01D 5/14* | (2006.01) |
| *H02K 7/06* | (2006.01) |

(52) U.S. Cl.
CPC ........... *G01D 5/145* (2013.01); *G01D 11/245* (2013.01); *H02K 5/22* (2013.01); *H02K 7/108* (2013.01); *H02K 7/116* (2013.01); *H02K 11/20* (2016.01); *H02K 11/215* (2016.01); *H02K 11/33* (2016.01); *H02K 11/38* (2016.01); *H02K 17/32* (2013.01); *H02K 7/06* (2013.01)

(58) Field of Classification Search
CPC ........ H02K 17/32; H02K 7/116; H02K 7/108; H02K 5/22; H02K 7/11; H02K 11/30; G01D 5/145; G01D 11/245; F16D 25/12; F16D 25/082; F16D 29/005
See application file for complete search history.

(56) References Cited

U.S. PATENT DOCUMENTS

| | | | | |
|---|---|---|---|---|
| 2006/0108884 A1* | 5/2006 | Shiino | ..................... | B60T 8/267 310/89 |
| 2009/0078489 A1* | 3/2009 | Feier | ................... | F16H 61/0006 180/339 |
| 2011/0156545 A1* | 6/2011 | Wen | ........................ | H02K 11/38 310/68 B |
| 2012/0176073 A1* | 7/2012 | Amagasa | ................ | H02K 7/116 318/400.38 |
| 2012/0241281 A1 | 9/2012 | Franz et al. | | |
| 2013/0207491 A1* | 8/2013 | Hatfield | ................. | H02K 3/522 310/50 |
| 2013/0270971 A1 | 10/2013 | Dorner et al. | | |
| 2014/0216841 A1* | 8/2014 | Winter | ..................... | H02K 7/11 180/271 |
| 2015/0135868 A1* | 5/2015 | Nikolaev | ................. | H02K 7/06 74/89.34 |
| 2015/0365022 A1* | 12/2015 | DiMarco | ................ | H02N 1/004 318/116 |
| 2017/0114640 A1* | 4/2017 | Biro | ......................... | F01C 1/084 |
| 2017/0271947 A1* | 9/2017 | Ando | ..................... | B65H 18/10 |
| 2018/0062479 A1* | 3/2018 | Stewart | ................... | H02K 21/24 |

FOREIGN PATENT DOCUMENTS

| | | | |
|---|---|---|---|
| DE | 10 2013 201 473 A1 | | 7/2014 |
| JP | 6-292346 A | | 10/1994 |
| JP | 07-304344 A | | 11/1995 |
| JP | 10-129445 A | | 5/1998 |
| JP | 2005-176526 A | | 6/2005 |
| JP | 2009-196627 A | | 9/2009 |
| JP | 2011-114921 A | | 6/2011 |
| JP | 2013-128390 A | | 6/2013 |
| JP | 2013-529450 A | | 7/2013 |
| KR | 10-2006-0101609 A | | 9/2006 |
| WO | WO-98/10971 A1 | | 3/1998 |
| WO | WO-2011/127888 A2 | | 10/2011 |

OTHER PUBLICATIONS

International Search Report in International Application No. PCT/KR2015/008242, filed Aug. 6, 2015.
Office Action dated Dec. 21, 2018 in Chinese Application No. 201580071821.7.
Supplementary European Search Report dated Jun. 25, 2018 in European Application No. 15875473.9.
Office Action dated Dec. 3, 2019 in Japanese Application No. 2017-535438.

* cited by examiner

MOTOR AND CLUTCH ACTUATOR INCLUDING SAME

CROSS-REFERENCE TO RELATED APPLICATIONS

This application is the U.S. national stage application of International Patent Application No. PCT/KR2015/008242, filed Aug. 6, 2015, which claims priority to Korean Application No. 10-2014-0192403, filed Dec. 29, 2014, the disclosures of each of which are incorporated herein by reference in their entirety.

TECHNICAL FIELD

The present invention relates to a motor, and more particularly, to a motor including a sensor connecting part configured to measure a state of an actuator, and a clutch actuator including the motor.

BACKGROUND ART

A rotary shaft of a motor is connected to an actuator to transmit a driving force thereto. At this time, the motor and the actuator can be integrally manufactured according to characteristics of the actuator. For example, a driving shaft of the actuator and a rotary shaft of the motor can be integrally formed by forming the motor and the actuator together in one housing or using a tube-type rotor. In addition, a control module configured to control the motor according to a state of the actuator can be provided.

However, the motor having such a structure has a problem in that a size of the motor is increased due to the tube-type rotor. In addition, sensors configured to measure the state of the actuator are connected to the control module, but an operation of connecting the sensors to the control module is difficult and a connecting structure thereof is complex, and thus there is a problem in that reliability of sensed information is reduced.

Particularly, since the driving shaft of the actuator and the rotary shaft of the motor are integrally formed, there are problems in that precise position control is difficult, and compatibility of component replacement is reduced. In addition, since a large-sized bearing is installed at a side of the motor to overcome a load acting on the actuator, there is a problem in that the size of the motor is increased.

DISCLOSURE

Technical Problem

The present invention is directed to providing a motor in which a driving shaft of an actuator and a rotary shaft of the motor are separately formed, a size thereof may be decreased, and sensors may be easily connected to a control module, and a clutch actuator including the motor.

The scope of the present invention is not limited to the above-described objects, and other unmentioned objects may be clearly understood by those skilled in the art from the following descriptions.

Technical Solution

One aspect of the present invention provides a motor including a housing, a control part coupled to the housing, a stator assembly coupled to an inside of the housing and connected to the control part, a rotor disposed inside the stator, a rotary shaft coupled to the rotor, and a sensor connecting part including a body mounted on the housing and having a sensor mounting part, and a terminal included in the body and connected to the sensor mounting part and the control part, wherein the sensor mounting part is disposed outside the housing.

The sensor mounting part may be disposed in front of the housing to which another component is connected.

The control part may be disposed at a rear of the housing.

The body may be directly connected to the control part so that the terminal is electrically connected to the control part.

The sensor mounting part may include a first mounting part disposed to face a center of a shaft of the rotary shaft and a second mounting part disposed on a front end of the body.

The motor may further include a displacement sensor mounted on the first mounting part, and a pressure sensor mounted on the second mounting part.

The second mounting part may include a coupling slot in which an inlet is formed to face forward.

The housing may include a mounting slot to which a body of the sensor connecting block is detachably coupled.

The body may include a first body having the sensor mounting part and a second body inserted into the mounting slot and coupled to the control part.

The first body and the second body may be coupled to be stepped.

A connecting fin connected to the terminal and coupled to the control part may be formed on an end of the second body.

The second body may be disposed between the stator assembly and an inner surface of the housing.

The control part may be coupled to a rear surface of the housing.

A power terminal of the stator may be directly connected to the control part.

The rotor may be integrally molded with and is coupled to the first sensor magnet.

A second sensor magnet may be coupled to a rear end of the rotary shaft, and the control part may include a hall sensor disposed to face the second sensor magnet.

A power terminal, a neutral terminal connected to the power terminal and a coil, and a bearing may be integrally molded to form the stator assembly.

Another aspect of the present invention provides a clutch actuator including a motor having a housing, a control part coupled to the housing, a stator assembly coupled to an inside of the housing and connected to the control part, a rotor disposed inside the stator, a rotary shaft coupled to the rotor, a body mounted on the housing and having a sensor mounting part, and a terminal included in the body and connected to the sensor mounting part and the control part, wherein the sensor mounting part is disposed outside the housing, a cover including a cylinder having an inlet and an outlet, and a piston connected to the rotary shaft to reciprocate in the cylinder.

The sensor mounting part may include a first mounting part disposed to face a center of a shaft of the rotary shaft, and a second mounting part disposed on a front end of the body.

The piston may include a displacement sensor magnet and a displacement sensor mounted on the first mounting part.

The front end of the body may communicate with the outlet and include a pressure sensor mounted on the second mounting part.

The clutch actuator may further include a lead screw configured to connect the piston and the rotary shaft.

The cover may include a bearing configured to support the lead screw.

Advantageous Effects

According to one embodiment of the present invention, since mounted sensors are disposed outside a housing and a sensor connecting block mounted on the housing and directly connected to a control part is provided, a configuration and an operation of connecting the sensors to the control module are simplified, and thus there are advantageous effects in that efficiency of an assembly operation is increased and reliability of sensing information is improved.

In addition, according to one embodiment of the present invention, since a rotary shaft of a motor and a driving shaft of an actuator are separately provided, there is an advantageous effect in that compatibility for component replacement is improved.

In addition, according to one embodiment of the present invention, since a rotary shaft of a motor and a driving shaft of an actuator are separately provided and the rotary shaft of the motor is provided as a solid body, there is an advantageous effect in that a size of the motor can be decreased.

In addition, according to one embodiment of the present invention, since a rear surface of a housing is formed as a control part so that the housing and the control part are integrally formed, there are advantageous effects in that an assembly structure thereof can be simplified and a size of a motor can be decreased.

In addition, according to one embodiment of the present invention, since a bearing on which a load of an actuator is applied is installed at the actuator to support a lead screw, a size of a bearing installed at a motor is relatively decreased, and thus there is an advantageous effect in that a size of the motor is decreased.

In addition, according to one embodiment of the present invention, since a sensor connecting block is detachably coupled to a housing to be directly connected to a control part, there is an advantageous effect in that an assembly thereof is facilitated.

MODES OF THE INVENTION

Hereinafter, exemplary embodiments of the present invention will be described in detail with reference to the accompanying drawings. Purposes, specific advantages, and novel features of the present invention will be made clear from the exemplary embodiments and the following detailed description in connection with the accompanying drawings. Terms and words used in this specification and claims thereof are not to be interpreted as limited to commonly used meanings or meanings in dictionaries, and should be interpreted as having meanings and concepts which are consistent with the technological scope of the present invention based on the principle that the inventors have appropriately defined concepts of terms in order to describe the present invention in the best way. In the description of the present invention, when it is determined that detailed descriptions of related well-known functions unnecessarily obscure the gist of the present invention, the detailed descriptions will be omitted.

It should be understood that, although the terms including ordinal numbers such as second, first, and the like may be used herein in reference to elements of the present invention, such elements are not to be construed as limited by these terms. These terms are only used to distinguish one element from another. For example, a second element could be termed a first element, and a first element could be termed a second element, without departing from the scope of the present invention. Herein, the term "and/or" includes any and all combinations of one or more referents.

Figure 1:
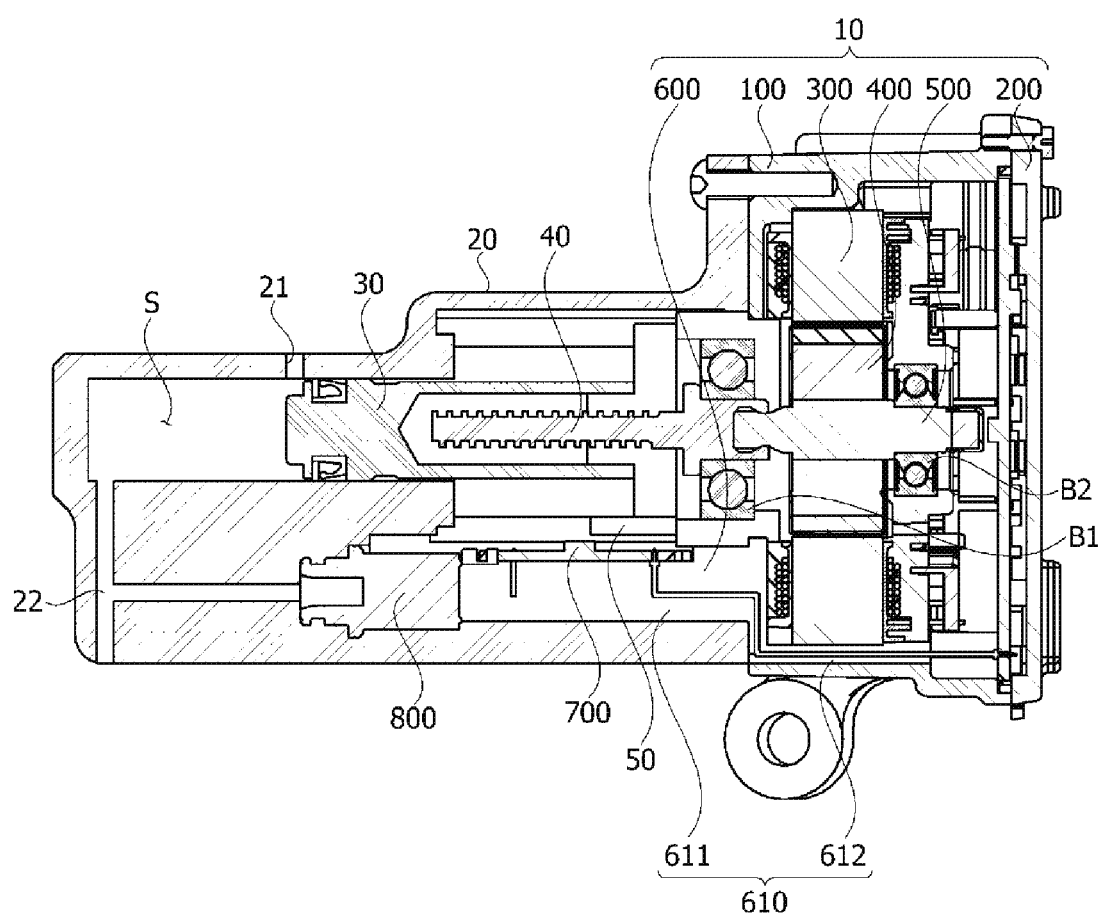
FIG. 1 is a view illustrating a clutch actuator according to one exemplary embodiment of the present invention.

FIG. 1 is a view illustrating a clutch actuator according to one exemplary embodiment of the present invention. FIG. 1 is a view clearly illustrating main features for a clear conceptual understanding of the present invention, and thus various modifications are expected and the scope of the present invention is not limited to specific shapes illustrated in the drawing.

Referring to FIG. 1, the clutch actuator according to one exemplary embodiment of the present invention may include a motor 10, a cover 20, a piston 30, and a lead screw 40. When the motor 10 is driven, the lead screw 40 rotates and the piston 30 linearly moves as the lead screw 40 rotates. An accommodation space S for a fluid is provided inside the cover 20, and the piston 30 is located in the accommodation space S. In addition, an inlet 21 and an outlet 22 in communication with the accommodation space S may be formed in the cover 20. A working fluid is supplied to the accommodation space S through the inlet 21, and the working fluid is discharged from the accommodation space S through the outlet 22. A working fluid pushed by the piston 30 and discharged through the outlet 22 may operate a clutch mounted on a vehicle. Meanwhile, a displacement sensor magnet 50 may be installed at the lead screw 40.

Figure 2:
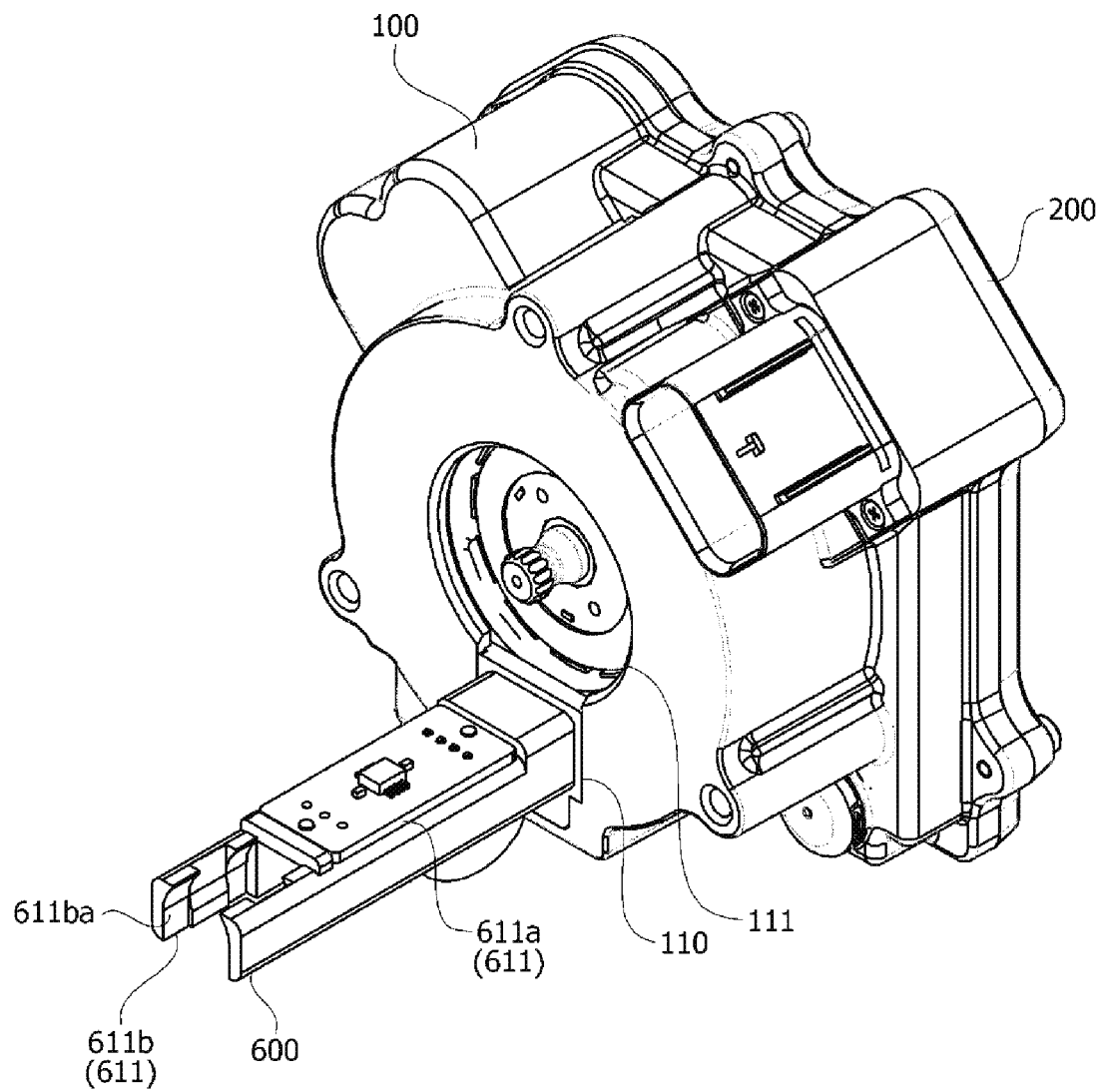
FIG. 2 is a view illustrating a motor illustrated in FIG. 1.
Figure 3:
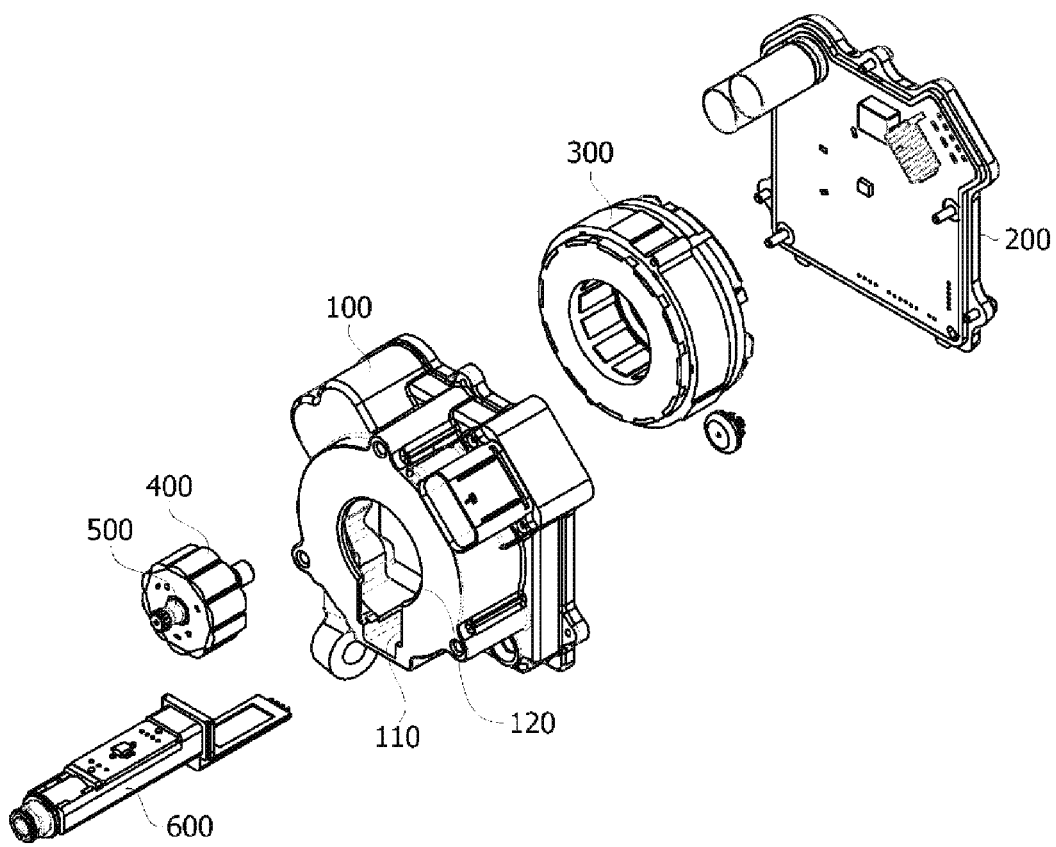
FIG. 3 is an exploded view of the motor illustrated in FIG. 2.
Figure 4:
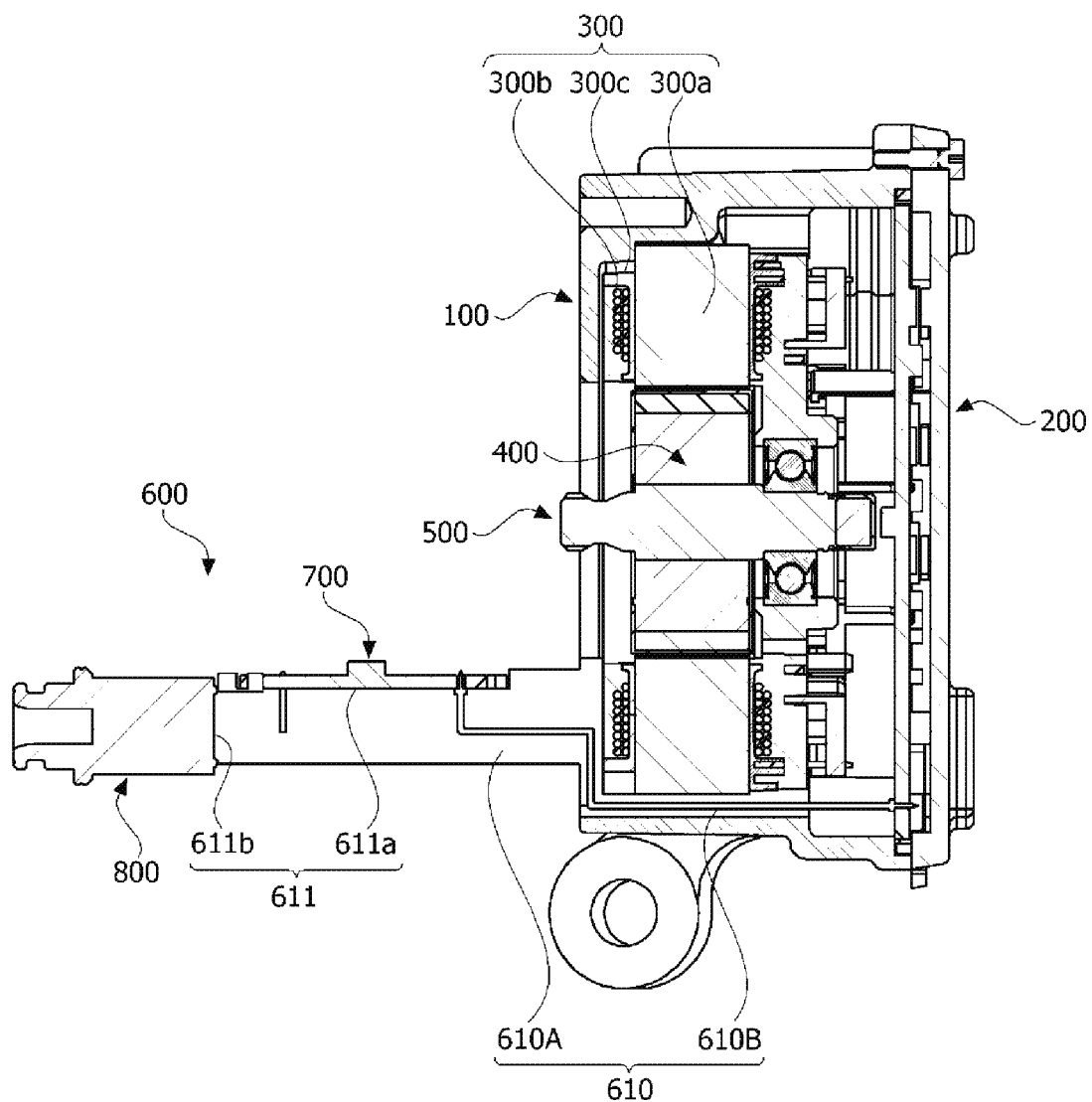
FIG. 4 is a side cross-sectional view of the motor illustrated in FIG. 2.

FIG. 2 is a view illustrating a motor illustrated in FIG. 1, FIG. 3 is an exploded view of the motor illustrated in FIG. 2, and FIG. 4 is a side cross-sectional view of the motor illustrated in FIG. 2. FIGS. 2 to 4 are views clearly illustrating main features for a clear conceptual understanding of the present invention, and thus various modifications are expected and the scope of the present invention is not limited to specific shapes illustrated in the drawings.

Referring to FIGS. 1 to 4, the motor 10 according to the exemplary embodiment of the present invention may include a housing 100, a control part 200, a stator assembly 300, a rotor 400, a rotary shaft 500, and a sensor connecting part 600.

The housing 100 is formed in a cylindrical shape so that a space in which the stator assembly 300, the rotor 400, and the like may be installed is provided therein. The housing 100 is formed to be coupled to the cover 20. Here, although a shape or material of the housing 100 may be variously changed, a metal material capable of easily withstanding a high temperature may be selected for the housing 100 because the housing 100 is installed in a vehicle. For example, one portion of the housing 100, that is, a front surface of the housing 100 connected to an actuator, may be made of aluminum. Alternatively, the entire housing 100 may be made of aluminum.

The actuator may be coupled to a side of the front surface of the housing 100, and the control part 200 may be coupled to a side of a rear surface of the housing 100. In addition, a mounting slot 110 into which the sensor connecting part 600 is detachably inserted may be formed in the front surface of the housing 100.

A center hole 111 forming a space in which the rotary shaft 500 is located and the lead screw 40 is connected to the rotary shaft 500 may be provide at the center of the housing 100, and the mounting slot 110 may be formed under the center hole 111.

The control part 200 controls driving of the motor 10 on the basis of a state of the actuator transmitted from the sensor connecting part 600 and an external driving signal. Such a control part 200 may be integrally formed with the housing by being disposed at a rear of the housing 100 as a rear cover of the housing 100.

Figure 5:
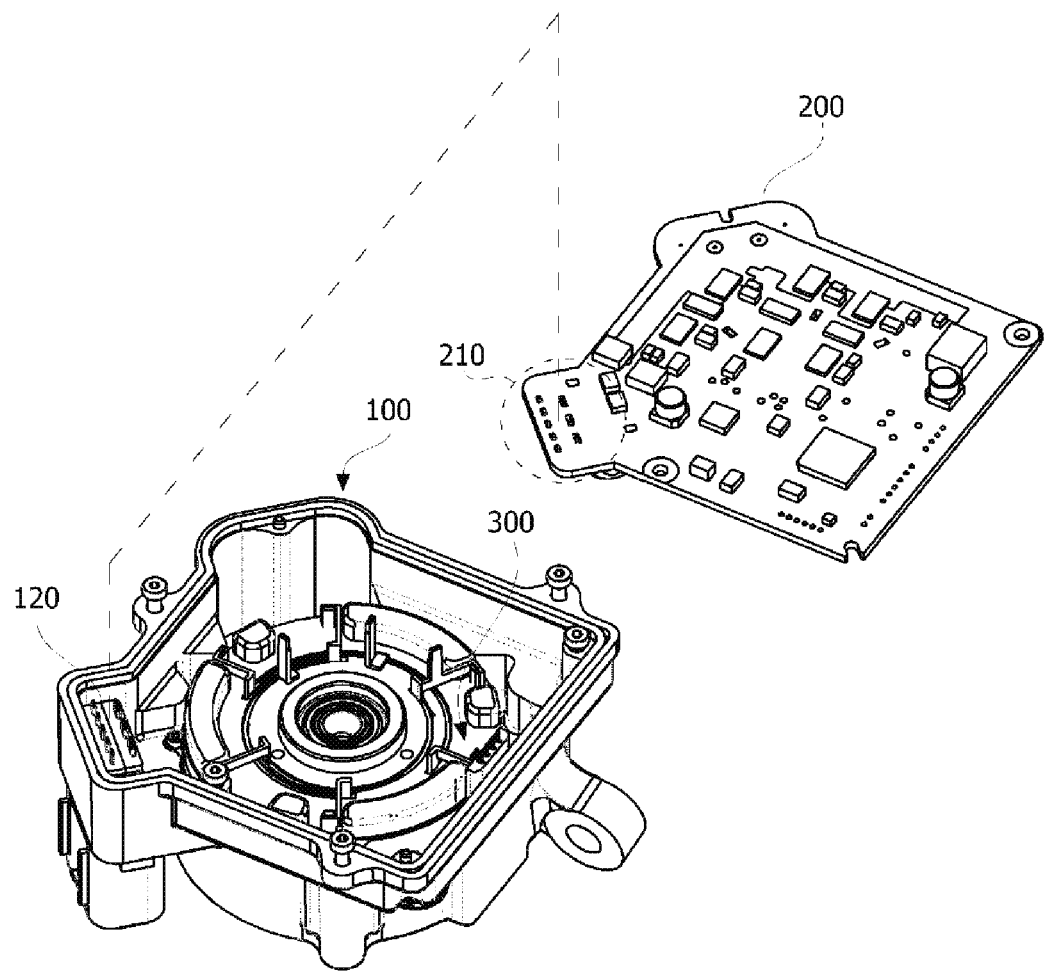
FIG. 5 is a view illustrating a control part disposed on a rear surface of a housing.

FIG. 5 is a view illustrating a control part disposed on a rear surface of a housing.

Referring to FIG. 5, a housing terminal 120 may be provided on the rear surface of the housing 100. The housing terminal 120 may be disposed on a corner portion of the housing 100. The housing terminal 120 may be electrically connected to an external power source. Meanwhile, a terminal insertion part 210 corresponding to such a housing terminal 120 may be formed on a corner portion of the control part 200. The control part 200 may be coupled to the rear surface of the housing 100 so that the housing terminal 120 is inserted into the terminal insertion part 210.

The stator assembly 300 may include a stator core 300a (see FIG. 4), and a coil 300b (see FIG. 4) configured to form a rotating magnetic field may be wound around the stator core 300a. The coil 300b wound around the stator core 300a may be insulated by being surrounded by an insulator 300c (see FIG. 4).

Figure 6:
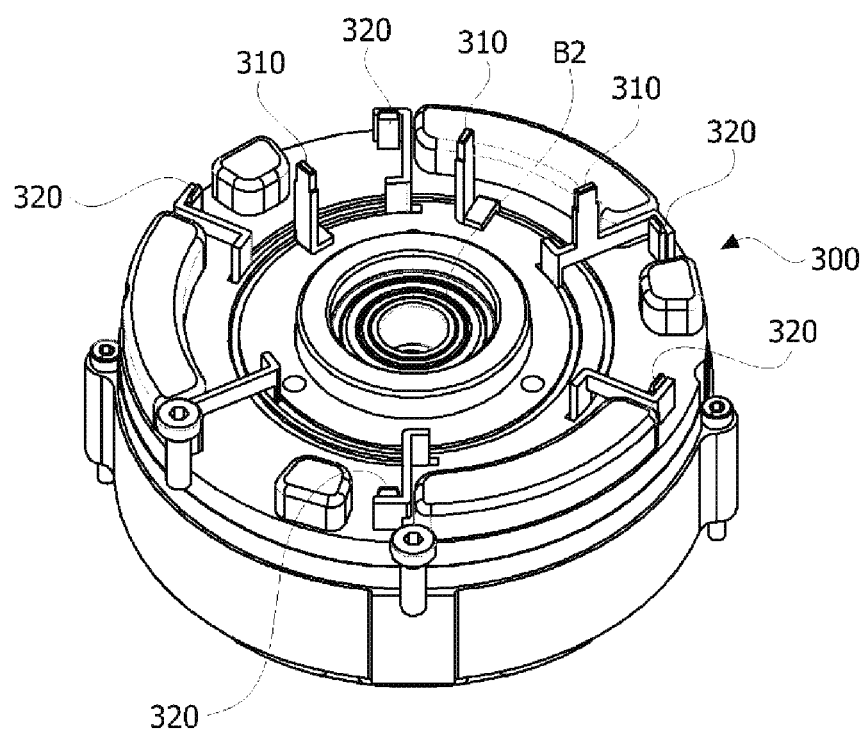
FIG. 6 is a view illustrating a stator assembly.

FIG. 6 is a view illustrating a stator assembly.

Referring to FIG. 6, the stator assembly 300 may be implemented to include a bus bar and a bearing therein. The stator assembly 300 may be formed by the stator core 300a (see FIG. 4), the coil 300b, and the insulator 300c being integrally molded together so that a power terminal 310 and a connecting terminal of a neutral terminal 320 are exposed to the outside. The stator assembly 300 may be formed by a bearing B2 being also integrally molded therewith together in a center thereof. A connecting terminal of one side of the power terminal 310 is extended in a radial direction to be fused and connected to the neutral terminal 320. In addition, a connecting terminal of the other side of the power terminal 310 may be formed to protrude upward to be directly connected to the control part 200.

Figure 7:
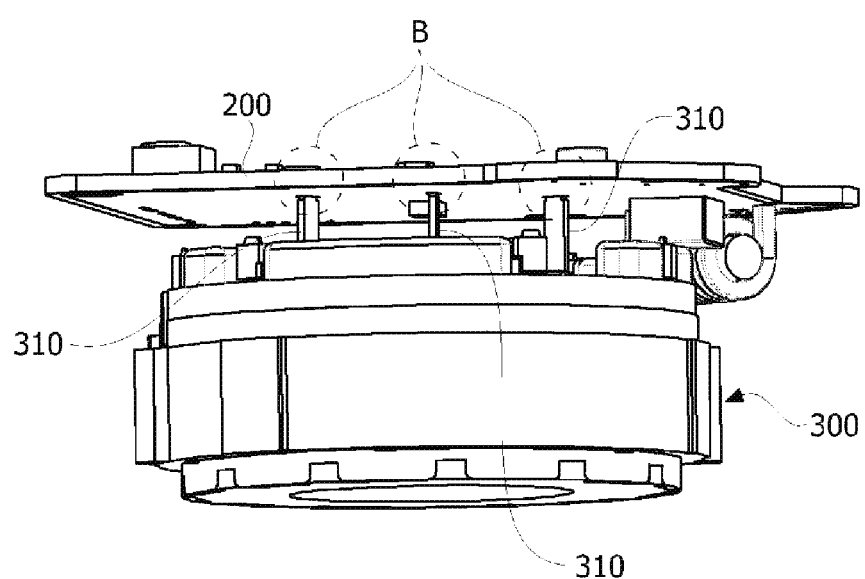
FIG. 7 is a view illustrating a stator assembly that is directly connected to a control part.

FIG. 7 is a view illustrating a stator assembly that is directly connected to a control part.

Referring to FIG. 7, power terminals 310 which protrude upward and have three phases may be assembled by being inserted into portions B of the control part 200 and then fixed at portions B by a soldering.

Figure 8:
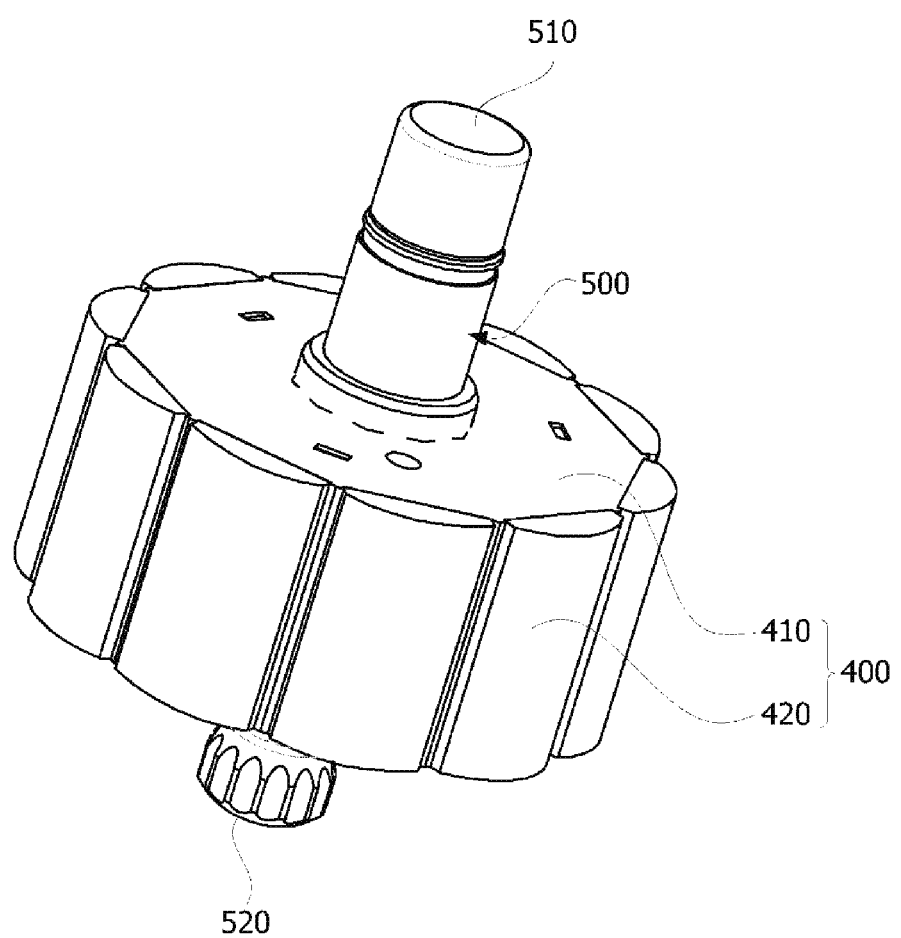
FIG. 8 is a view illustrating a rotor.

FIG. 8 is a view illustrating a rotor.

The rotor 400 is rotatably disposed inside the stator assembly 300. The rotor 400 is rotated by electromagnetic interaction with the stator assembly 300 due to a magnet 420 being mounted on a rotor core 410 thereof. For example, a coil is wound around the stator assembly 300 so that the stator assembly 300 has a magnetic pole, and the rotor 400 is rotatable due to a magnetic field formed by the coil wound around the stator assembly 300. The rotary shaft 500 may be coupled to the center of the rotor 400. Accordingly, when the rotor 400 rotates, the rotary shaft 500 also rotates.

The rotor 400 may be implemented to include the magnet 420 included in the rotor core 410 or to be attached to a circumferential surface of the rotor core 410 as illustrated in FIG. 8. In addition, a sensor magnet 510 may be installed on a front end of one side of the rotary shaft 500. The sensor magnet 510 is for measuring a rotational speed of the motor 10. Meanwhile, a spline groove 520 for connecting to the lead screw 40 (see FIG. 1) may be formed on a front end of the other end of the rotary shaft 500.

In this way, the magnet 420 is mounted on the rotor core 410, the sensor magnet 510 is mounted on the rotary shaft 500, and then the rotor 400 coupled to the rotary shaft 500 may be formed by over-molding with plastic.

Figure 9:
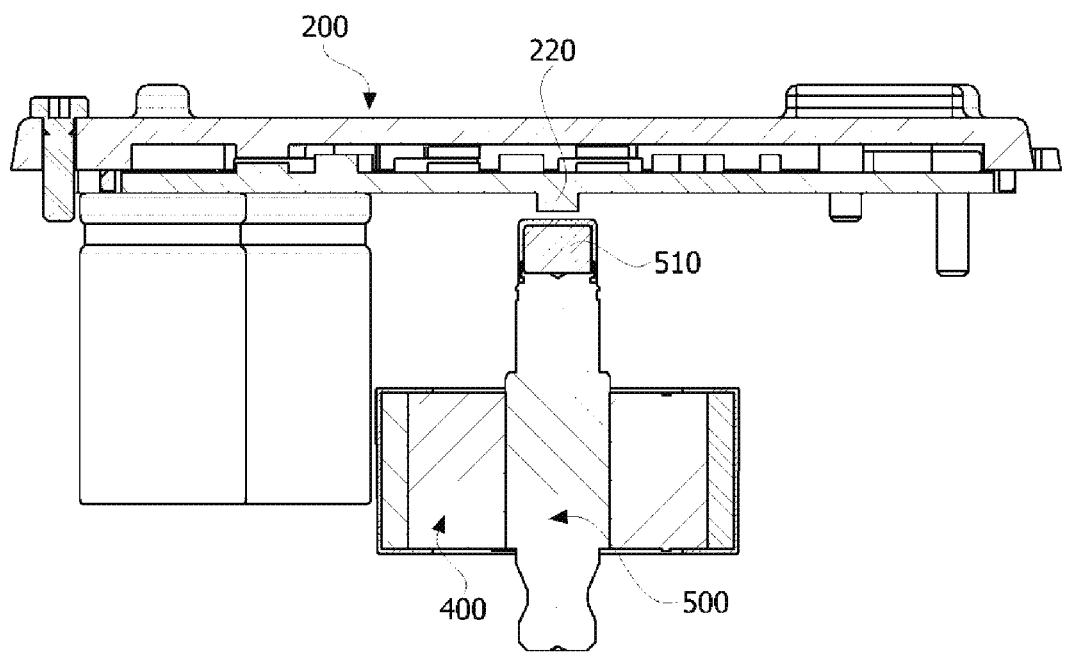
FIG. 9 is a view illustrating a sensor magnet of a rotary shaft and a hall sensor of a control part disposed to face each other.

FIG. 9 is a view illustrating a sensor magnet of a rotary shaft and a hall sensor of a control part disposed to face each other.

Referring to FIG. 9, a hall sensor 220 is provided at the control part 200, and the sensor magnet 510 is disposed to face the hall sensor 220. The control part 200 may directly measure the rotational speed of the motor 10 using the hall sensor 220.

Figure 10:
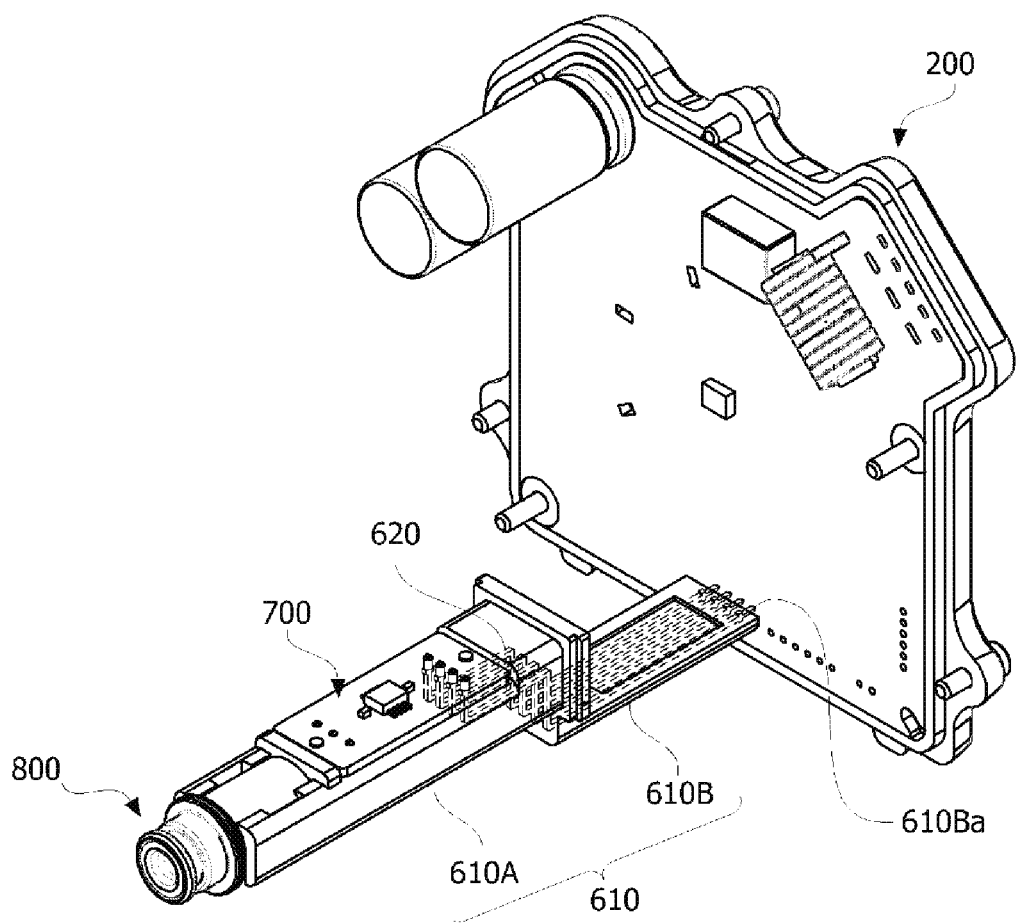
FIG. 10 is a view illustrating a sensor connecting part that is connected to a control part.

FIG. 10 is a view illustrating a sensor connecting part that is connected to a control part.

Referring to FIGS. 2, 4, and 10, the sensor connecting part 600 serves to transmit measurement information of a sensor installed in front of the housing 100 in which the actuator is mounted to the control part 200 disposed at a rear of the housing 100. In addition, the sensor connecting part 600 serves to secure a sensing space in which a state of the actuator may be easily measured in front of the housing 100.

Such a sensor connecting part 600 may include a body 610 and a terminal 620.

The body 610 serves to spatially connect the front of the housing 100 at which sensors are located to the rear of the housing 100 at which the control part 200 is located. Such a body 610 may mainly include a first body 610A and a second body 610B. The first body 610A and the second body 610B may be connected to be stepped, and may be divided and described only according to shapes and functional features thereof but may be a single unit in which the first body 610A and the second body 610B are connected.

The first body 610A and the second body 610B may be implemented as blocks having hexagonal shapes. In addition, when the sensor connecting part 600 is coupled to the housing 100 through the mounting slot 110, the first body 610A is a portion exposed in front of the housing 100, and the second body 610B is a portion located in the housing 100.

The sensor mounting part 611 may be provided on the first body 610A. The sensor mounting part 611 may include a first mounting part 611a and a second mounting part 611b.

The first mounting part 611a may be disposed on an upper surface of the first body 610A to face the center of the rotary shaft 500. The first mounting part 611a may be electrically connected to the terminal 620.

A displacement sensor 700 may be mounted on the first mounting part 611a. The displacement sensor 700 may interact with the displacement sensor magnet 50 attached to the lead screw 40 to detect a position of the piston 30.

The second mounting part 611b may be disposed on a front end of the first body 610A. In addition, the second mounting part 611b may be electrically connected to the terminal 620.

The second mounting part 611b may be formed in a similar shape as the coupling slot 611ba (see FIG. 2) such that an inlet is formed to face forward. A pressure sensor 800 may be mounted on such a second mounting part 611b. As illustrated in FIG. 1, the pressure sensor 800 is connected to the outlet 22 configured to discharge a working fluid to detect a hydraulic pressure applied to a clutch.

The second body 610B may be located between the stator assembly 300 and an inner surface of the housing 100. Accordingly, a thickness of the second body 610B may be less than that of the first body 610A. In addition, the second body 610B may be physically connected to the control part 200.

A connecting fin 610Ba connected to the terminal 620 and inserted into a connecting terminal of the control part 200 may be formed on an end of the second body 610B.

The terminal 620 is disposed in the first body 610A and the second body 610B and is connected to the first mounting part 611a, the second mounting part 611b, and the connecting fin 610Ba. Such a terminal 620 transmits position information of the lead screw 40 measured by the displacement sensor 700 and pressure information of the working fluid measured by the pressure sensor 800 to the control part 200.

Such a sensor connecting part 600 is detachably coupled to the housing 100 in a form in which the sensor connecting part 600 is inserted into the housing 100 and directly connected to the control part, and thus connects the sensors such as the displacement sensor 700 and the pressure sensor 800, to the control part 200 with a simple structure. In addition, since the sensor connecting part 600 is located inside the cover 20 in a state of being mounted on the housing 100, dustproofing and waterproofing reliability can be improved.

The motor and the clutch actuator including the motor according to one exemplary embodiment of the present invention have been specifically described above with reference to the accompanying drawings.

While the present invention has been particularly described with reference to exemplary embodiments, those skilled in the art should understand that various changes in form and details may be made without departing from the spirit and scope of the present invention. Therefore, the exemplary embodiments should be considered in a descriptive sense only and not for purposes of limitation. The scope of the present invention is defined not by the detailed description of the present invention but by the appended claims, and encompasses all modifications and equivalents that fall within the scope of the appended claims.

| Reference Numerals | |
|---|---|
| 10: MOTOR | 20: COVER |
| 21: INLET | 22: OUTLET |
| 30: PISTON | 40: LEAD SCREW |
| 50: DISPLACEMENT SENSOR MAGNET | |
| 100: HOUSING | 110: MOUNTING SLOT |
| 111: CENTER HOLE | 120: HOUSING TERMINAL |
| 200: CONTROL PART | 210: TERMINAL INSERTION PART |
| 220: HALL SENSOR | 300: STATOR ASSEMBLY |
| 300A: STATOR CORE | 300B: COIL |
| 300C: INSULATOR | 310: POWER TERMINAL |
| 320: NEUTRAL TERMINAL | 400: ROTOR |

| Reference Numerals -continued | |
|---|---|
| 410: ROTOR CORE | 420: MAGNET |
| 500: ROTARY SHAFT | 510: SENSOR MAGNET |
| 520: SPLINE GROOVE | 600: SENSOR CONNECTING PART |
| 610: BODY | 610A: FIRST BODY |
| 610B: SECOND BODY | 611: SENSOR MOUNTING PART |
| 611A: FIRST MOUNTING PART | |
| 611B: SECOND MOUNTING PART | |
| 620: TERMINAL | 700: DISPLACEMENT SENSOR |
| 800: PRESSURE SENSOR | |

The invention claimed is:

1. A motor comprising:
a housing;
a control part coupled to the housing;
a stator assembly coupled to an inside of the housing and connected to the control part;
a rotor disposed inside the stator;
a rotary shaft coupled to the rotor; and
a sensor connecting part including a body mounted on the housing and having a sensor mounting part, and a terminal included in the body and connected to the sensor mounting part and the control part;
wherein the body includes a first body and a second body that is coupled to the first body at a first end of the second body, the second body extending away from the first body in a first direction towards the control part,
wherein the first body is a portion exposed in front of the housing and having the sensor mounting part,
wherein the second body is a portion located in the housing and is coupled to the control part,
wherein the terminal is disposed in both the first body and the second body, and
wherein the motor comprises a connecting fin that extends away from a second end of the second body in the first direction, the connecting fin being connected to the terminal and coupled to the control part, and the second end of the second body being opposite from the first end of the second body.

2. The motor of claim 1, wherein the control part is disposed at a rear of the housing.

3. The motor of claim 1, wherein the sensor mounting part includes a first mounting part and a second mounting part electrically connected to the terminal,
wherein the first mounting part is disposed to face a center of a shaft of the rotary shaft, and
wherein the second mounting part is disposed on a front end of the body so that it is electrically connected to the terminal.

4. The motor of claim 1, wherein the housing includes a mounting slot, and
wherein the sensor connecting part is detachably coupled to the mounting slot.

5. The motor of claim 1, wherein the first body and the second body are coupled to be stepped.

6. The motor of claim 1, wherein the second body is disposed between the stator assembly and an inner surface of the housing, and wherein a thickness of the second body is less than that of the first body.

7. The motor of claim 1, wherein a power terminal of the stator is directly connected to the control part.

8. The motor of claim 1, comprising a first sensor magnet, wherein the rotor is integrally molded with and is coupled to the first sensor magnet.

9. The motor of claim 1, wherein:
a second sensor magnet is coupled to a rear end of the rotary shaft; and
the control part includes a hall sensor disposed to face the second sensor magnet.

10. The motor of claim 1, wherein a power terminal, a neutral terminal connected to the power terminal and a coil, and a bearing are integrally molded to form the stator assembly.

11. The motor of claim 1, wherein the sensor connecting part comprises a displacement sensor and a pressure sensor mounted thereon.

12. A motor comprising:
a housing;
a control part coupled to the housing;
a stator assembly coupled to an inside of the housing and connected to the control part;
a rotor disposed inside the stator;
a rotary shaft coupled to the rotor; and
a sensor connecting part including a body mounted on the housing and having a sensor mounting part, and a terminal included in the body and connected to the sensor mounting part and the control part;
wherein the body includes a first body and a second body,
wherein the first body is a portion exposed in front of the housing and having the sensor mounting part,
wherein the second body is a portion located in the housing and is coupled to the control part,
wherein the sensor mounting part comprises a first mounting part and a second mounting part electrically connected to the terminal,
wherein the first mounting part is disposed to face a center of a shaft of the rotary shaft,
wherein the second mounting part is disposed on a front end of the body so that it is electrically connected to the terminal, and
wherein the sensor connecting part comprises:
a displacement sensor mounted on the first mounting part; and
a pressure sensor mounted on the second mounting part.

13. The motor of claim 12, wherein the second mounting part includes a coupling slot in which an inlet is formed to face forward.

* * * * *